Nov. 20, 1945.   S. H. TILLETT   2,389,243
JIG FOR USE IN DRILLING AND LIKE OPERATIONS
Filed March 10, 1943   4 Sheets-Sheet 1
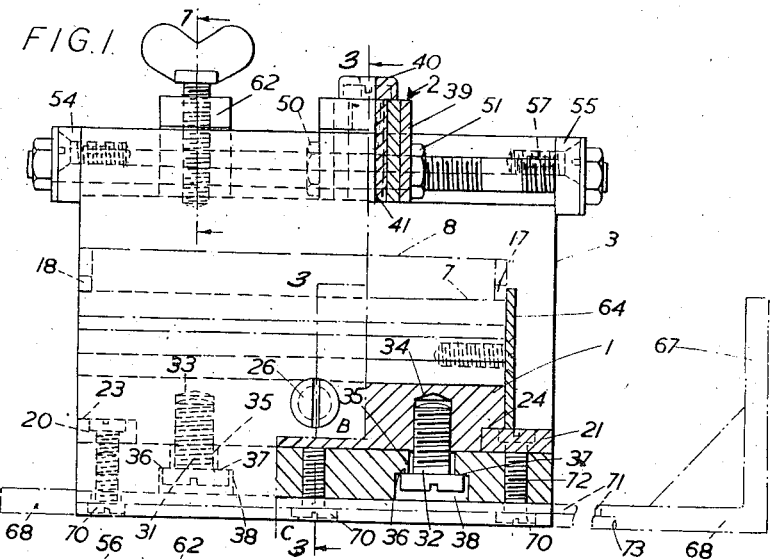
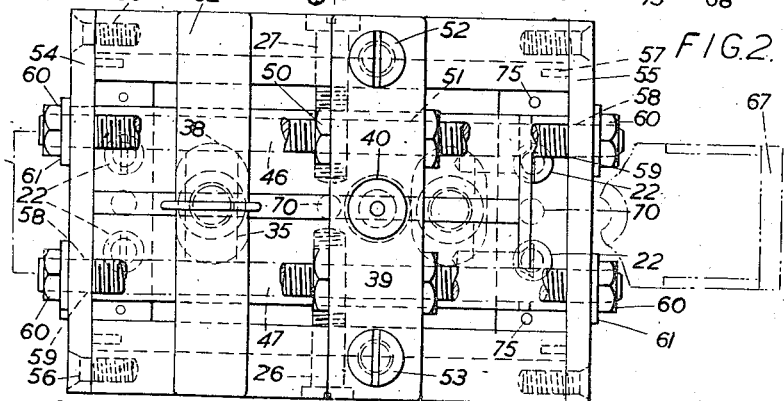
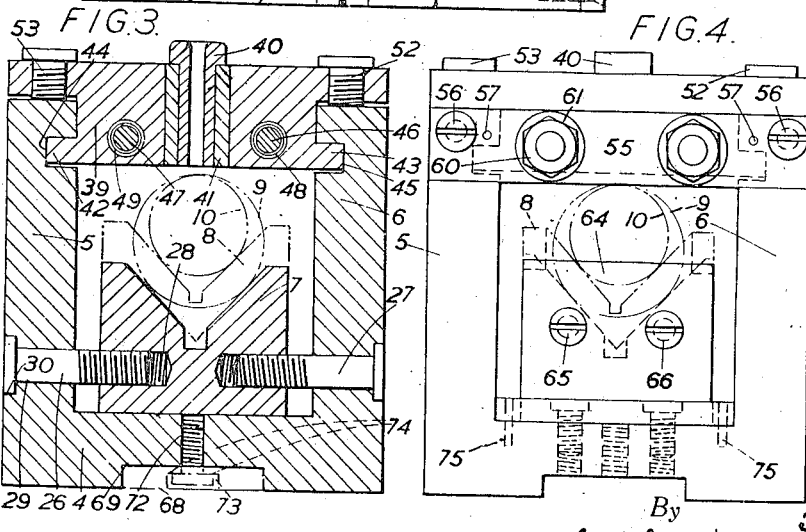
Inventor:—
Stanley
Horace
Tillett,
By Smith, Michael & Gardiner
Attorneys.

Nov. 20, 1945.   S. H. TILLETT   2,389,243
JIG FOR USE IN DRILLING AND LIKE OPERATIONS
Filed March 10, 1943   4 Sheets-Sheet 2
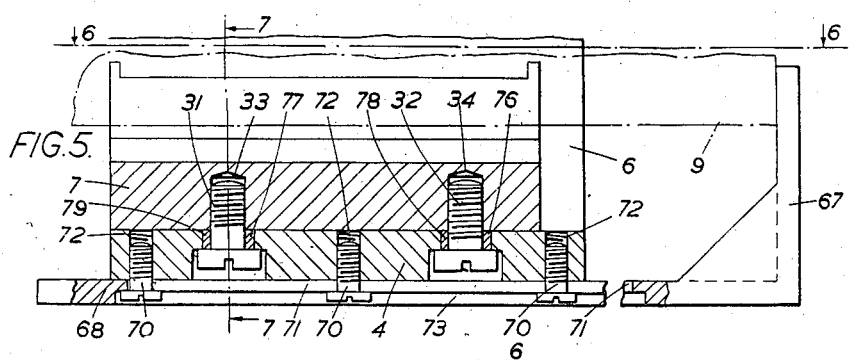
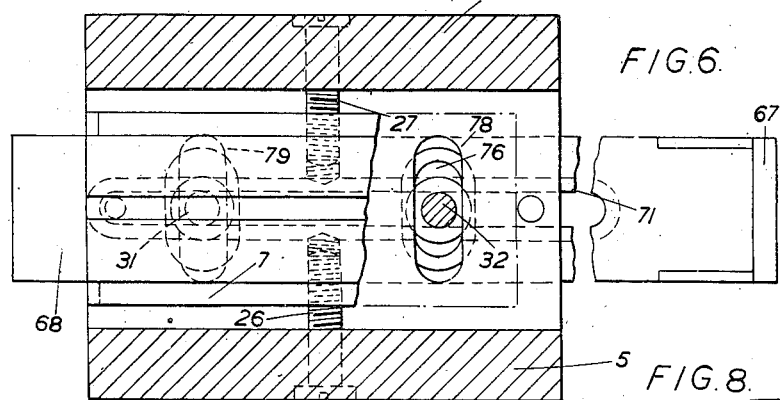
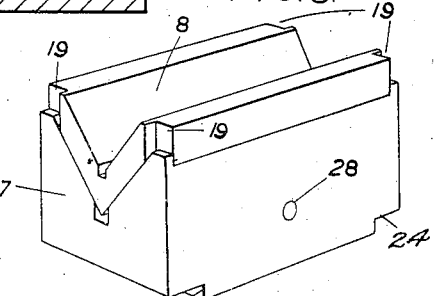
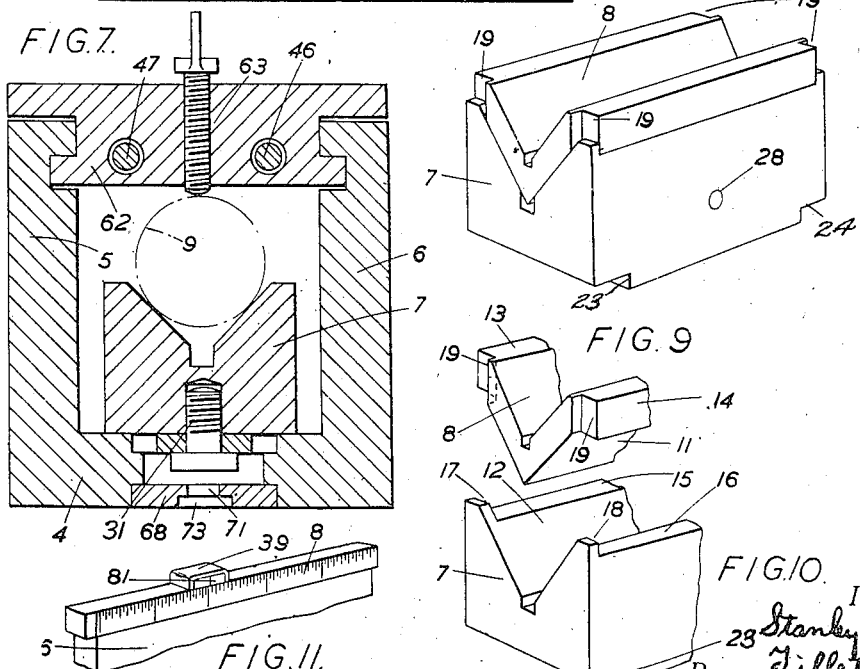
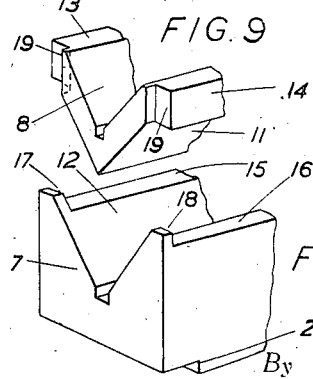

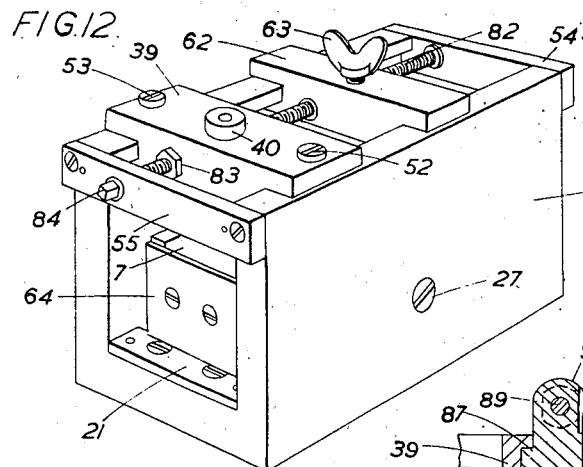
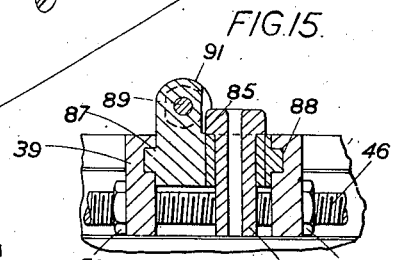
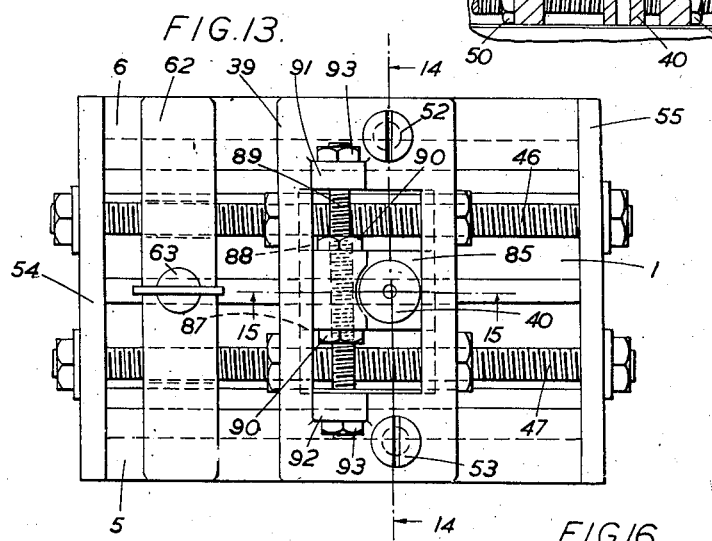
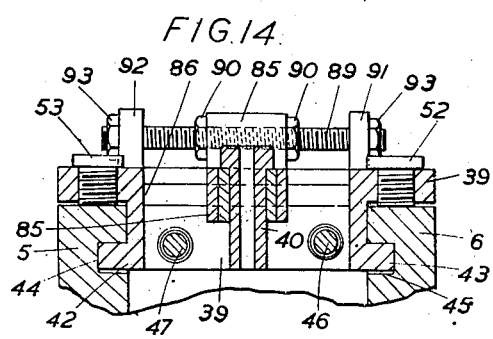
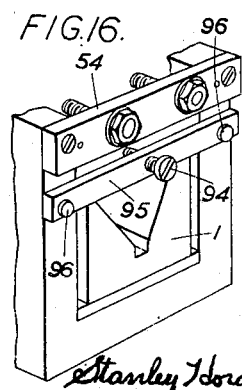

Nov. 20, 1945.    S. H. TILLETT    2,389,243
JIG FOR USE IN DRILLING AND LIKE OPERATIONS
Filed March 10, 1943    4 Sheets-Sheet 4
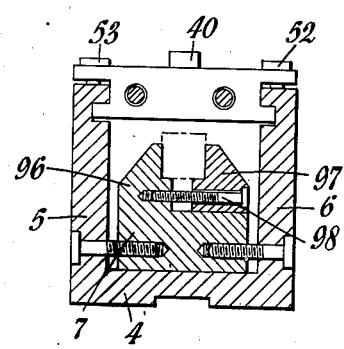
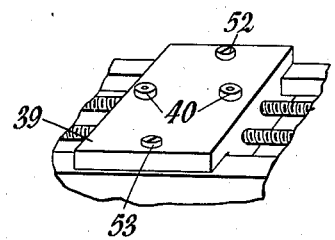
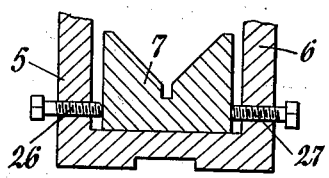
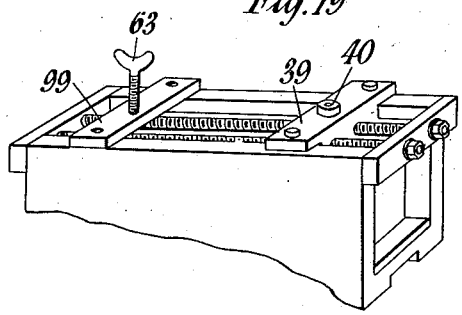

Patented Nov. 20, 1945

2,389,243

UNITED STATES PATENT OFFICE 2,389,243

JIG FOR USE IN DRILLING AND LIKE OPERATIONS

Stanley Horace Tillett, Wanstead, England

Application March 10, 1943, Serial No. 478,716
In Great Britain October 14, 1942

8 Claims. (Cl. 77—62)

This invention relates to adjustable bench jigs for drilling, tapping, countersinking, broaching and like operations performed, more especially, upon rod-shaped work, for example round rod, of the type comprising a locating block, for example a V block, for the work, a locating guide for the drilling or other tool to be used with the jig and a holder carrying the locating block and the locating guide, the relative positions of the block and the guide longitudinally and transversely of the jig and therefore of the work in position on the block being adjustable and the jig being a "bench" jig in the sense that it is of the class commonly employed on a workshop bench for drilling, say, small component parts of machinery and the like.

The object of the invention is to provide certain improvements in adjustable bench jigs of this type, as hereinafter indicated.

According to the invention, an adjustable bench jig comprises a locating block for the work, a locating guide for the tool, disposed above the locating block, and a holder carrying the block and the guide, which block and which guide are both adjustable in the jig, one transversely thereof and the other longitudinally thereof, independently of one another as regards both of the directions of adjustment, for the purposes of adjusting the relative positions of the tool axis of the guide and the work in position on the block longitudinally and transversely of the jig, and which block is of a length which is at least equal to the range of adjustment of the block and the guide relatively to one another longitudinally of the jig so as to be capable of providing the necessary support to the work in the upward direction as it is being drilled, irrespective of the relative positions of the guide and the block longitudinally of the jig.

Further according to the invention, the locating guide may be adjustable both longitudinally of the jig and also transversely thereof. With such an arrangement the possible range of transverse adjustment in the jig is considerably increased as compared to the case where the locating guide is adjustable only in the one direction.

Further according to the invention, a preferred construction is one in which the holder of the jig is a member of U-shape in vertical cross-section with the locating guide mounted upon and displaceable along the sides of the U at the top thereof and the locating block mounted upon and displaceable across the bottom of the U. With such a construction it is readily possible to design a jig which while being capable of exceedingly fine and accurate adjustment is of very rugged and consequently strong proportions. Thus, in the first place, the U-shaped member forming the holder of the jig may be of any necessary thickness to ensure the requisite strength of the jig. Secondly, the mounting of the locating guide upon the side of this member at the top thereof enables a design to be readily produced which will ensure a high degree of accuracy of adjusting movement of the guide relatively to the holder and therefore to the work in position on the locating block; for example the guide may be arranged to slide with an accurate guiding fit in grooves in the top of the holder. Thirdly, the mounting of the locating block upon the bottom of the U-shaped member again enables a design to be readily produced ensuring a high degree of accuracy of adjusting movement, as between the locating block and the holder; for example, the block may be arranged to slide on the bottom of the holder with an accurate guiding fit between a pair of guide rails thereon disposed one at each end of the block.

Further according to the invention, in the case where the jig is of the preferred construction set forth above, the locating block may be adjusted by feed screw means consisting of a pair of oppositely acting screws disposed transversely of the block and engaging the same against the reaction of the sides of the U-shaped holder.

Further according to the invention, the locating guide, as regards the adjusting movement thereof longitudinally of the jig, may be movable lengthwise of a fixed screw or screws therein disposed longitudinally of the jig and having threaded on to it or them clamping nuts which clamp the guide to the screw or screws and thereby lock it in the adjusted position.

Further according to the invention, in the case where the locating guide is mounted upon the holder with an accurate guiding fit therewith as regard movement of the guide longitudinally of the holder, means may be provided for clamping the guide in the adjusted position thereof to the holder in such a manner that the guiding surfaces on the guide are forced into engagement with those on the holder, with the result that not only does the guide become secured in its adjusted position relatively to the holder, but also the tool axis of the guide is always forced into its designed position in the jig relatively to the work therein irrespective of the position of the guide along the holder.

The locating block is preferably interchangeable in the jig with another of a different shape or size as regard the V or other work engaging surfaces of the block, to suit a different shape or size of work, and similarly, the locating guide or a separately removable part thereof, for example a cylindrical bush, having in it the hole through which the tool extends with a guiding fit when the jig is in use, may be interchangeable with another of a different hole diameter to suit a different size of tool.

The invention will now be further described with reference to the accompanying drawings, in which, Figure 1 is partly an extended elevation of the jig, according to one preferred construction thereof, and partly a central longitudinal section therethrough, the part which is section being the part to the right of the line 3, B, C on the figure and the part which is an elevation being the part to the left of said line;

Figure 2 is a plan of the jig shown in Figure 1;

Figure 3 is a vertical transverse section through the jig shown in Figures 1 and 2, on the section line 3—3—3 of Figure 1;

Figure 4 is an end view of the jig shown in Figures 1 to 3;

Figure 5 is a central longitudinal section through the lower part only of the jig according to an alternative construction as regards the manner of guiding the locating block in its adjusting movement laterally of the jig and of fixing it in the adjusted position relatively to the holder;

Figure 6 is a section through Figure 5 on the section line 6, 6 thereof;

Figure 7 is a vertical transverse section partly through Figure 5 and partly through Figure 1 on the section lines 7, 7 of those figures;

Figure 8 is a perspective view of a sectional form of locating block forming part of the jig of the preceding figures;

Figures 9 and 10 are fragmentary perspective views of the upper and lower sections of the locating block of Figure 8;

Figure 11 is a fragmentary perspective view of a portion of the jig at one side thereof showing a detail hereinafter described;

Figure 12 is a perspective view of the jig of the preceding figures, but showing an alternative construction as regards the means of adjusting the locating guide for the tool lengthwise of the jig;

Figure 13 is a plan view of the jig of said preceding figures, showing a construction in which the locating guide for the tool is adjustable both longitudinally of the jig and also transversely thereof;

Figures 14 and 15 are a fragmentary transverse section on the section line 14, 14 of Figure 13 and a fragmentary longitudinal section on the section line 15, 15 thereof;

Figure 16 is a fragmentary end view of the jig showing a further detail hereinafter described, and Figures 17 to 20 are fragmentary views illustrating certain modifications hereinafter described.

Like reference numerals indicate like parts in the various figures.

Referring first to Figures 1 to 4, the jig there shown comprises a locating block 1, namely a V block, for the work, a locating guide, generally designated 2, for the drill and a holder 3 for the block and the guide.

The holder is of U-shape in vertical transverse section and its comprises a bottom 4 and two sides 5, 6.

The block 1 comprises a lower section 7 and an upper section 8, the upper section being shown in chain line in Figures 1, 3 and 4. It is of this sectional form in order to accommodate different sizes of work, the lower section 7 being used when a work 9 (shown in chain line in Figures 3 and 4) of larger size is to be wrought upon in the jig and the two sections together when a work 10 (shown also in chain line in Figures 3 and 4) of smaller size is to be wrought upon. The upwardly presented face of each section, which forms the work-engaging surface of the section, is of V-contour transversely of the block and as shown in Figures 8, 9 and 10, the two sections nest into one another, the upper section being carried upon the lower section. Thus, the underside 11 of the upper section 8 is of V-contour transversely of the section so as accurately to fit the upwardly presented face 12 of the lower section 7. Along the sides of the upper section 8 are a pair of laterally directed flanges 13, 14 which overlie and rest with an accurate seating fit upon a corresponding pair of surfaces 15, 16 on the top of the lower section 7 at the two sides thereof. The flanges 13, 14 are accurately located on the surfaces 15, 16 with consequent accurate location of the section carrying them longitudinally of the block, by a pair of upwardly directed horns 17, 18 at each end of the block. The horns 17, 18 are integral with the lower section 7 of the block and the corners of the upper section 8 thereof are recessed as at 19 to receive them. In this way an exceedingly simple construction is provided, it having been found that if the sections of the block are interfitted together in the manner described, it is unnecessary to fix them to one another in order to ensure against their relative displacement in the use of the jig. If desired, however, they may be fixed to one another, for example by means of screws extending along the centre of the block, in which case the horns 17, 18 and recesses 19 could be dispensed with.

As shown in the figures, the locating block is mounted upon the upwardly presented face 4 of the holder and is adjustable thereacross within the limits of two spaces left on either side respectively of the block between the latter and the inwardly presented faces of the walls 5, 6.

The block is guided in this movement by a pair of rails 20, 21 screwed down on to the upwardly presented face of the bottom of the holder by screws 22 and received in recesses 23, 24 formed in the two ends respectively of the lower section 7 of the block. The surfaces of these recesses and the surfaces in contact therewith of the rails 20, 21 are machined true, for the purposes of accurate guiding of the block and, if desired, the rails may have locating dowels 75 on them fitting into accurately positioned holes provided to receive them in the holder.

The block is moved across the holder by a pair of oppositely-acting feed screws 26, 27. These screws are screw-threaded for a portion only of their length, at the end remote from the head of the screw, and the screw-threaded portion engages in a tapped hole 28 in the block while the unscrewthreaded portion adjacent the head of the screw has a free revoluble fit in a hole 29 provided to receive it in the corresponding side 5 (or 6) of the holder. The head of the screw is let into a recess 30 provided to receive it in the outwardly presented face of the wall 5 (or 6). The block is adjusted by outscrewing one of the screws and inscrewing the other. As shown, the screws engage only with the lower section 7 of the block, the upper section being movable as a unit therewith in the adjusting movement of the block.

For the purpose of securing the block relatively to the holder in its adjusted position thereacross, a pair of clamping screws 31, 32 are provided. These screws engage in tapped holes 33, 34 in the lower section 7 of the block and the shank of the screw in each case extends freely through an elongated hole 35 in the bottom of the holder. The holes 35 are elongated in the direction of width of the jig and the length of the holes is sufficient to accommodate the full range of adjusting movement of the block relatively to the holder. The heads of the screws underlie in the case of each screw a pair of shoulders 36, 37 extending along the two sides respectively of the hole 35. These shoulders are formed by the top of a recess 38 in the underside of the bottom 4 of the holder and the arrangement is such that by tightening up the screws against the shoulders, the block may be securely fixed in its adjusted position against displacement therefrom in the use of the jig.

The locating guide 2 comprises a bridge 39 spanning the central space of the jig between the two sides 5, 6 of the holder as clearly shown in Figure 3. At the centre of the bridge 39 is a drilling bush 40. This bush, which is interchangeable in the jig with another or others of different bore diameter, is received with an accurate push fit in a sleeve 41 in turn received with a force fit in a hole in the bridge. If desired, it may be secured in position in the sleeve by a locking screw.

The bridge 39 is mounted upon the sides 5, 6 of the holder and is slidable therealong for the purposes of adjustment of the bush 40 longitudinally of the jig.

For this purpose the bridge is formed along the two sides with a pair of flanges 42, 43 which work with an accurate guiding fit in grooves 44, 45 in the sides 5, 6 of the holder.

The bridge 39 is adjusted by hand along the holder and in its adjusting movement therealong it is movable lengthwise of a pair of screws 46, 47 extending longitudinally of the jig for the full length thereof. These screws 46, 47, which are formed with a fine-pitch thread, extend freely through holes 48, 49 provided to accommodate them in the bridge 39 and threaded on to each of them at either side of the bridge are a pair of clamping nuts 50, 51. These clamping nuts serve to fix the bridge in the adjusted position thereof to the screws and for the purpose of additionally securing the bridge in its adjusted position and at the same time ensuring that the tool axis of the locating guide, that is to say, the axis of the drilling bush 40, is always in its designed position relatively to the work irrespective of the position of adjustment of the guide along the holder as already explained herein, a pair of clamping screws 52, 53 are provided in the guide to screw down against the upwardly presented face of the sides 5, 6 of the holder and thereby clamp the flanges 42, 43 against the top of the grooves 44, 45.

The screws 46, 47 are carried upon a pair of supporting bars 54, 55. These bars extend across the end of the holder and are secured to the sides 5, 6 thereof by screws 56. They may also be provided with locating dowels 57 received in holes in the end face of the holder. The screws 46, 47 are of a reduced diameter at 58, where they extend through the supporting bars 54, 55, so as to provide at each end of the screw a shoulder 59 for abutment against the inwardly presented face of the bar 54 (or 55), the length of the screw between these shoulders being exactly equal to the length of the holder. They are secured to the supporting bars by nuts 60 exercising their pressure upon the bars through the intermediary of washers 61.

Also mounted upon the sides 5, 6 of the holder at the top thereof and slidable therealong is a bridge 62 similar to the bridge 39 except that it is not provided with clamping screws such as the clamping screws 52, 53. The bridge 62 carries a screw 63, the function of which is to clamp the work firmly in position on the locating block when the jig is in use. If desired, the screw may be provided at the end towards the work with a shoe or the like (not shown) for distributing the pressure of the screw over the surface of the work and thereby preventing damage thereto by reason of said pressure. As will be understood, there is no need for clamping screws such as the screws 52, 53 of the bridge 39 in connection with the bridge 62 since that bridge becomes firmly held in its adjusted position by the reaction of the screw 63.

If desired or if necessary, according for example to the size or particular purpose of the jig, there may be more than one bridge 62 and work clamping screw 63, the two or more bridges with their respective clamping screws being disposed at successive positions along the jig.

At one end, namely, the right hand end in Figures 1 and 2, of the locating block is a fixed stop 64 for locating the work relatively to the block in the direction of length of the jig. In the use of the jig, the work abuts this stop, which as shown in the figures, is of a sufficient height to serve its purpose irrespective of whether the lower section 7 only of the block is in use or both sections. It is secured to the end face of the lower section 7 by a pair of screws 65, 66 and by removing these it is removable from place in the jig when it is required to bring a second stop 67, hereinafter more particularly described, into use.

It will be seen that when the locating block of the jig is in the central position in which it appears in the figures, the drilling axis is coincident with the centre of the V and therefore with the centre of the work in position thereon (assuming the work be round-section as shown) and when the block is in an adjusted position to one side or the other of the central position, the drilling axis is correspondingly to one side or the other of the centre of the V.

It will also be seen that the locating block at the end thereof whereat the stop 64 is situated is inset slightly from the end of the holder. This is for the purpose of enabling the drilling axis of the jig to be brought if required right up to the extreme end of the work at the end thereof adjacent the stop.

The stop 67 is an L-shaped member, the base 68 of which is horizontal and is received within and slidable along a recess 69 in the underside of the holder of the jig. By adjusting the base 68 along the recess 69, the position of the active portion 67 of the stop is adjustable relatively to the locating block in the direction of length thereof. The purpose of this stop is to increase the maximum effective length of the jig between the end of the locating block at which the stop is provided and the drilling axis of the locating guide. In other words, the jig comprises two stops, one, namely the stop 64 for use when the distance of the point along the work from the end thereof at which the drill or other tool is to operate is within the compass of the length of the jig, and the other, namely the stop 67, for use when this distance is outside said compass. In this connection it will be understood that the position of the work longitudinally thereof in the jig will depend upon the position in the work longitudinally thereof of the hole or the like to be drilled or otherwise wrought therein.

For the purpose of securing the stop 67 in the adjusted position thereof three set screws 70 are provided. These extend through a long slot 71 in the base 68 of the stop and they engage tapped holes 72 provided to receive them in the bottom of the holder. The heads of the screws occupy a recess 73 formed in the underside of the base 68 co-extensively with the slot 71 therein and when screwed home they abut shoulders 74 formed by the top of the recess, so clamping the stop in the adjusted position to the bottom of the holder.

The locating block is interchangeable in the jig in the manner hereinbefore described with another or others of different size or different shape, either as a whole or as regards the upper section 8 or the lower section 7 only of the block.

Instead of employing a composite (sectional) block as in the particular construction described above, a plain (unitary) block may be employed, which again may be interchangeable in the jig with another or others of a different size or shape.

The construction illustrated in Figures 5, 6 and 7 is one in which instead of employing rails such as the rails 20, 21 for guiding the locating block in its adjusting movements, a pair of shoes 76, 77 carried respectively upon the clamping screws 31, 32 and having an accurate sliding fit with a pair of guide slots 78, 79 in the bottom 4 of the holder are provided. In all other respects the construction is similar to that described with reference to Figures 1 to 4.

If desired, for the purpose of assisting in first moving the bridge 39 to an approximately adjusted position along the jig, prior to moving it to accurately adjusted position therealong, the jig may carry a scale 80 (see Figure 11) upon the outwardly presented face of one of the sides 5 (or 6) of the holder, at the top thereof, to cooperate with a mark 81 carried upon the adjacent end face of the bridge.

The construction illustrated in Figure 12 is one in which the guide 39 is adjusted by a feed screw 82 rotatable about its axis but of fixed position in the jig longitudinally thereof. This feed screw engages a thread in the bridge 39, the latter having in it a tapped hole for the reception of the screw, and a pair of locking nuts 83 are provided on the screw, one at each side of the bridge, for clamping the latter to the screw and thereby fixing it in its adjusted position.

For operating the screw, the latter has a square 84 at one end which can be engaged by a spanner or turning handle (not shown).

Apart from the foregoing feature, of the bridge 39 being adjusted by a feed screw, the jig illustrated in Figure 12 is of the same general construction as that of the jig of the preceding figures.

The construction illustrated in Figures 13 to 15 is one in which, as already remarked, the tool locating guide is adjustable both longitudinally and transversely of the jig. For this purpose, the drilling bush 40 is carried in a block 85 which is traversable with accurately guided movement across the bridge 39, within the compass of an opening 86 therein. Any convenient construction may be employed in this respect. In the construction shown the block has a pair of flanges 87 at the ends which work with an accurate guiding fit in grooves 88 in the bridge. The block is adjusted by hand and in its adjusting movement is movable lengthwise of a screw 89 affixed in the bridge and having threaded on to it a pair of clamping nuts 90 which serve, by clamping the block between them, to fix it in its adjusted position. The screw 89 is carried upon a pair of lugs 91, 92 upstanding from the top of the bridge and is affixed thereto by nuts 93 on the ends of the screw.

Apart from the foregoing feature, of adjustability of the drilling bush both longitudinally and also transversely of the jig, the latter is of the same general construction as that of the jig of the preceding Figures 1 to 11.

If desired, means may be provided in the jig for ensuring that the work is positioned firmly home against the stop 64 or 67 of the jig. For example, as shown in Figure 16, a set screw 94 may be provided for this purpose, carried in a supporting bar 95 in turn removably carried upon the end face of the holder, for instance on studs 96 projecting from said end face, the set screw being arranged to engage the end adjacent to it of the work in position on the locating block.

It will be seen upon reference to the drawings that the parts comprising the jig are so designed that the clearance between the bush of the locating guide and the work is reduced to a minimum. This is in order to avoid wandering of the point of the tool due to bending of an unsupported portion of the shank thereof, more especially when operating upon curved-section, for example round-section, work.

It will also be seen that the locating block is designed with a clearance for the tool, namely the channel at the bottom of the V, at the point where it breaks through the work. In this way provision is made against damage either to the tool or to the block. It will be appreciated that the width of the channel referred to will depend upon the size of the work, the size of the tool and the range of positive movement of the locating block in the jig transversely of the holder.

It will further be seen upon reference to the drawings that the distance between the lower edge of the supporting bars 54, 55 and the level of the upper face of the bottom of the holder is sufficient to enable the locating block either as a whole or as regards the upper section only to be withdrawn from place in the jig, for example for interchange with another of a different size or shape, by way of one end thereof, that is to say, without necessity to remove the locating guide or any of the parts associated therewith, namely the adjustment screws 46, 47 and the supporting bars 54, 55.

It may be necessary in the practical use of the invention to employ several sizes of locating block and corresponding sizes of holder and locating guide, allocated respectively to several successive ranges of sizes of V's or other work-engaging surfaces.

If the work to be wrought upon in the jig is of circular cross-section, the locating block of the jig will usually be a V block as in the particular embodiments of the invention above described.

If it is of square or other non-circular cross-section, preventing it from being used with a V, a block of the nature of a vice may be employed, the block in this case having, as shown in Figure 17, a fixed jaw 96 upstanding from the top of the block and a movable jaw 97 disposed parallel to the fixed jaw and adjustable towards and away from it with screw, cam or similar means 98 for forcing it towards the fixed jaw and thereby clamping the work between the jaws. With such a block the work may also be held down by one or more clamping screws or the like as with the use of a V-block.

Various other modifications also are possible, without departure from the invention. For example, the feed screws for the locating block may be screw-threaded to the holder instead of to the block, in which case they would abut the block at their inner end, as shown in Figure 18. The holding-down means for the work may be of fixed position in the jig instead of of adjustable position therein, in which case, as shown for example in Figure 19, the clamping screw 63 could be carried on a bridge 99 which is simply screwed down on to the top of the sides of the holder. In cases where a number of objects have to be drilled in an exactly similar manner with a plurality of holes of a given spacing and position, a locating guide may be employed having more than one bore, the number and disposition of the bores corresponding to the number and disposition of the holes to be drilled in the work. Figure 20 illustrates this modification.

In the following statement of claim, the jig which is the subject of this invention will be referred to as a "drilling jig." It is to be understood, however, that the invention is not limited to jigs which are used for drilling operations strictly speaking, but is applicable also to jigs for use in such operations as tapping, countersinking and broaching which are similar to drilling operations in that they involve the use of a rotatable tool which requires to be accurately located and guided in relation to the work. In the denomination, "drilling jig," therefore, as employed in the said statement of claim, the term "drilling" is to be understood as including such operations as tapping, countersinking and broaching, and correspondingly the term "tool," wherever used in the statement of claim, is to be understood as including not only a drill strictly speaking, but also a tapping, countersinking, broaching or like tool requiring, as stated, to be accurately located and guided with respect to the work.

What I claim as my invention and desire to secure by Letters Patent of the United States is:

1. An adjustable bench drilling jig comprising a locating block for the work, a locating guide for the tool and a holder carrying the block and the guide, which block and which guide are both adjustable in the jig, one transversely thereof and the other longitudinally thereof, for the purposes of adjusting the relative positions of the tool axis of the guide and the work in position on the block longitudinally and transversely of the jig, the holder being a member of U shape in vertical cross-section with the guide mounted upon and displaceable along the sides of the U at the top thereof and the block mounted upon and displaceable across the bottom of the U, the block being adjusted by feed screw means consisting of a pair of oppositely-acting screws disposed transversely of the block and engaging the same against the reaction of the sides of the holder, and means being provided for clamping the block in the adjusted position thereof to the bottom of the holder.

2. An adjustable bench drilling jig comprising a locating block for the work, a locating guide for the tool and a holder carrying the block and the guide, which block and which guide are both adjustable in the jig, one transversely thereof and the other longitudinally thereof, for the purposes of adjusting the relative positions of the tool axis of the guide and the work in position on the block longitudinally and transversely of the jig, the guide being movable lengthwise of at least one fixed screw incorporated in the jig longitudinally thereof and having threaded on to it clamping nuts which clamp the guide to the screw and thereby lock it in the adjusted position.

3. An adjustable bench drilling jig comprising a locating block for the work, a locating guide for the tool and a holder carrying the block and the guide, which block and which guide are both adjustable in the jig, one transversely thereof and the other longitudinally thereof, the holder being a member of U shape in vertical cross-section with the guide mounted upon and displaceable along the sides of the U at the top thereof, surfaces upon it having an accurate guiding fit with surfaces upon said sides of the U, and the block mounted upon and displaceable across the bottom of the U, surfaces upon it having an accurate guiding fit with surfaces upon said bottom of the U, and means being provided for clamping the guide in the adjusted position thereof to the holder in such a manner that the guiding surfaces on the guide are forced into engagement with those on the holder, with the result that not only does the guide become secured in its adjusted position relatively to the holder, but also the tool axis of the guide is always forced into its designed position in the jig irrespective of the position of the guide along the holder.

4. An adjustable bench drilling jig comprising a locating block for the work, a locating guide for the tool, a holder carrying the block and the guide, which block and which guide are both adjustable in the jig, one transversely thereof and the other longitudinally thereof, for the purposes of adjusting the relative positions of the tool axis of the guide and the work in position on the block longitudinally and transversely of the jig, a stop at one end of the block for locating the work in the direction of length of the block and means arranged so to engage the work at the end thereof remote from the stop as to force it firmly home thereagainst.

5. An adjustable bench drilling jig comprising a locating block for the work, a locating guide for the tool, a holder carrying the block and the guide, which block and which guide are both adjustable in the jig, one transversely thereof and the other longitudinally thereof, for the purposes of adjusting the relative positions of the tool axis of the guide and the work in position on the block longitudinally and transversely of the jig, a stop at one end of the block for locating the work in the direction of length thereof, which stop is adjustable longitudinally of the jig to increase the maximum effective length thereof between the end of the block at which the stop is provided and the tool axis of the guide, and means arranged so to engage the work at the end thereof remote from the stop as to force it firmly home thereagainst.

6. An adjustable bench drilling jig comprising a locating block for the work, a locating guide for the tool, disposed above the locating block, and a holder carrying the block and the guide, which block and which guide are both adjustable in the jig, one transversely thereof and the other longitudinally thereof, independently of one another as regards both of the directions of adjustment, for the purposes of adjusting the relative positions of the tool axis of the guide and the work in position on the block longitudinally and transversely of the jig, and which block is of a length which is at least equal to the range of adjustment of the block and the guide relatively to one another longitudinally of the jig so as to be capable of providing the necessary support to the work in the upward direction as it is being drilled, irrespective of the relative positions of the guide and the block longitudinally of the jig, the holder being a member of U shape in vertical cross-section, with the guide mounted upon the sides of the U at the top thereof and slidable with an accurate guiding fit in grooves therein longitudinally of the jig and the block mounted upon the bottom of the U and slidable thereacross with an accurate guiding fit with guide surfaces on the holder.

7. An adjustable bench drilling jig comprising a locating block for the work, a locating guide for the tool, disposed above the locating block, and a holder carrying the block and the guide, which block and which guide are both adjustable in the jig, one transversely thereof and the other longitudinally thereof, independently of one another as regards both of the directions of adjustment, for the purposes of adjusting the relative positions of the tool axis of the guide and the work in position on the block longitudinally and transversely of the jig, and which block is of a length which is at least equal to the range of adjustment of the block and the guide relatively to one another longitudinally of the jig so as to be capable of providing the necessary support to the work in the upward direction as it is being drilled, irrespective of the relative positions of the guide and the block longitudinally of the jig, the holder being a member of U shape in vertical cross-section, with the guide mounted upon the sides of the U at the top thereof and slidable with an accurate guiding fit in grooves therein longitudinally of the jig and the block mounted upon the bottom of the U and slidable thereacross with an accurate guiding fit with guide surfaces on the holder, which guide surfaces are constituted by rails extending across the bottom of the holder, one at each end of the block with the latter, at the bottom thereof, disposed between them.

8. An adjustable bench drilling jig comprising a locating block for the work, a locating guide for the tool, disposed above the locating block, and a holder carrying the block and the guide, which block and which guide are both adjustable in the jig, one transversely thereof and the other longitudinally thereof, independently of one another as regards both of the directions of adjustment, for the purposes of adjusting the relative positions of the tool axis of the guide and the work in position on the block longitudinally and transversely of the jig, and which block is of a length which is at least equal to the range of adjustment of the block and the guide relatively to one another longitudinally of the jig so as to be capable of providing the necessary support to the work in the upward direction as it is being drilled, irrespective of the relative positions of the guide and the block longitudinally of the jig, the holder being a member of U shape in vertical cross-section, with the guide mounted upon the sides of the U at the top thereof and slidable with an accurate guiding fit in grooves therein longitudinally of the jig and the block mounted upon the bottom of the U and slidable thereacross with an accurate guiding fit with guide surfaces on the holder, and the block being adjustable by feed screw means consisting of a pair of oppositely-acting screws disposed transversely of the block and engaging the same against the reaction of the sides of the holder.

STANLEY HORACE TILLETT.